United States Patent
Lin et al.

(10) Patent No.: US 10,189,996 B2
(45) Date of Patent: Jan. 29, 2019

(54) ANTHRACENE-BASED ORGANIC DYE

(71) Applicant: National Chi Nan University, Nantou (TW)

(72) Inventors: Ching-Yao Lin, Nantou (TW); Chin-Li Wang, Nantou (TW); Ming-Chi Tsai, Nantou (TW)

(73) Assignee: NATIONAL CHI NAN UNIVERSITY, Nantou (TW)

( * ) Notice: Subject to any disclaimer, the term of this patent is extended or adjusted under 35 U.S.C. 154(b) by 0 days.

(21) Appl. No.: 15/794,141

(22) Filed: Oct. 26, 2017

(65) Prior Publication Data
US 2018/0155549 A1    Jun. 7, 2018

(30) Foreign Application Priority Data

Dec. 5, 2016 (TW) .............................. 105140082 A

(51) Int. Cl.
    *C09B 1/00*   (2006.01)
    *C09B 57/00*  (2006.01)

(52) U.S. Cl.
    CPC .............. *C09B 1/00* (2013.01); *C09B 57/008* (2013.01); *Y02E 10/50* (2013.01)

(58) Field of Classification Search
    CPC ...................................................... C09B 1/00
    See application file for complete search history.

(56) References Cited

PUBLICATIONS

Fraind, et al. Journal of Physical Chemistry B (2013), 117 (20), 6304-6317.*

* cited by examiner

*Primary Examiner* — Shawquia Jackson
(74) *Attorney, Agent, or Firm* — Jacobson Holman, PLLC.

(57) ABSTRACT

Disclosed herein is an anthracene-based organic dye represented by Formula (1):

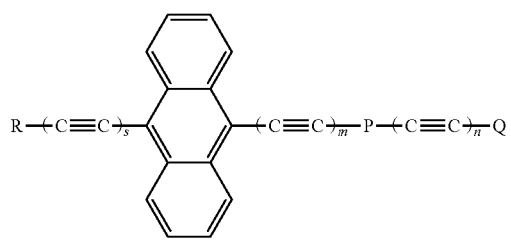

wherein the substituents contained in Formula (1) are as defined herein. The anthracene-based organic dye may be used as a photosensitizer in dye-sensitized solar cells to effectively absorb light having a wavelength range which covers the entire visible light wavelength range and which even expands to a near infrared wavelength range and convert the absorbed light into photoelectric current.

9 Claims, 1 Drawing Sheet

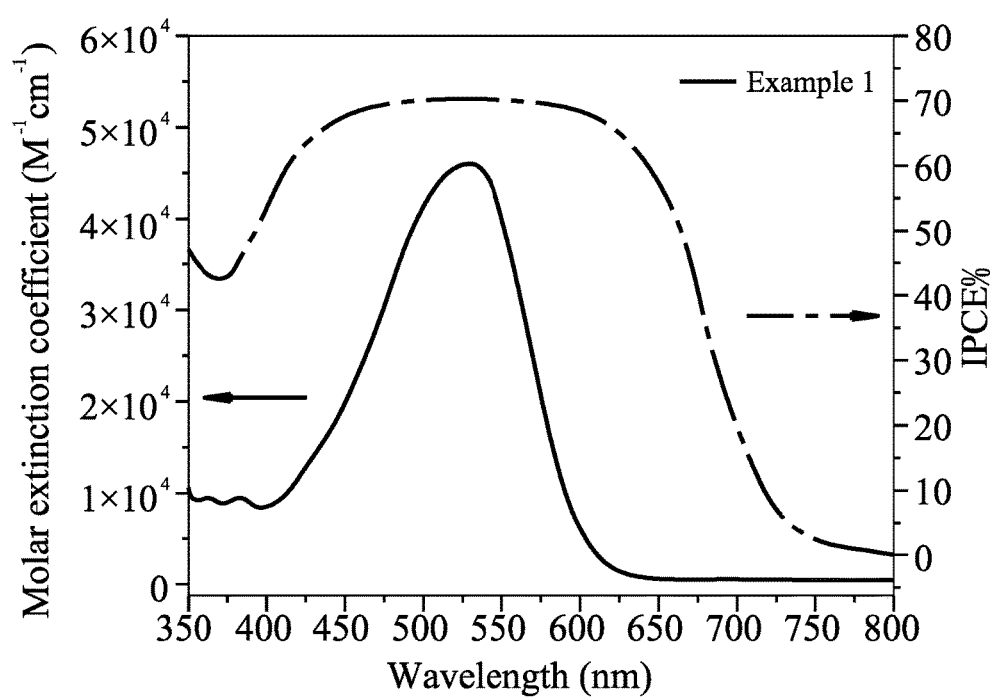

ANTHRACENE-BASED ORGANIC DYE

CROSS-REFERENCE TO RELATED APPLICATION

This application claims priority of Taiwanese Application No. 105140082, filed on Dec. 5, 2016.

FIELD

The disclosure relates to an organic dye, and more particularly to an anthracene-based organic dye.

BACKGROUND

In the technologies of renewable energy and energy recovery, dye-sensitized photovoltaic cells have a high potential. A photosensitizing dye on a working electrode of a dye-sensitized photovoltaic cell absorbs external optical energy, and electrons contained in the photosensitizing dye are thus excited and effectively injected into a conduction band of a semiconductor of the working electrode and are then conducted from the working electrode to a counter electrode through an external circuit so as to produce a photoelectric current. Therefore, the quality of the photosensitizing dye may affect the photoelectric conversion efficiency of the dye-sensitized photovoltaic cell.

The types of photosensitizing dye commonly used in the dye-sensitized photovoltaic cells include ruthenium complexes, porphyrin derivatives, and organic photosensitizing dyes. The ruthenium complexes have a relatively low molar absorption coefficient in a visible light region, metallic ruthenium is costly and rare, and ruthenium oxides are toxic. Therefore, the application of ruthenium complexes is limited. While porphyrin derivatives have high photoelectric conversion efficiency, the process for the synthesis of porphyrin derivatives is complicated and costly, so that porphyrin derivatives have not yet been commercially used as a photosensitizing dye in the manufacture of dye-sensitized photovoltaic cells.

The organic photosensitizing dyes are relatively simple in terms of chemical structure and synthesis process, and have the advantages of relatively low production cost and no heavy metal pollution as compared to ruthenium complexes and porphyrin derivatives. However, the photoelectric conversion efficiency of organic photosensitizing dyes is generally lower than those of ruthenium complexes and porphyrin derivatives. Therefore, it is an important trend in the field of dye-sensitized photovoltaic cells to develop an organic photosensitizing dye having enhanced photoelectric conversion efficiency.

An article entitled "Cost-Effective Anthryl Dyes for Dye-Sensitized Cells under One Sun and Dim Light" by Chin-Li Wang et al. in *The Journal of Physical Chemistry* C 2015, 119, 24282-24289 discloses an organic photosensitizing dye represented by Formula A:

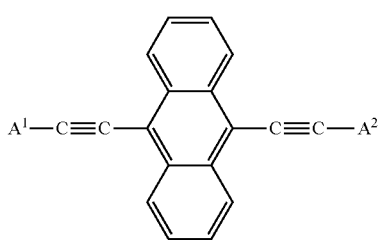

(A)

wherein
A$^1$ is selected from the group consisting of

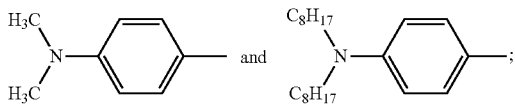

and
A$^2$ is selected from the group consisting of

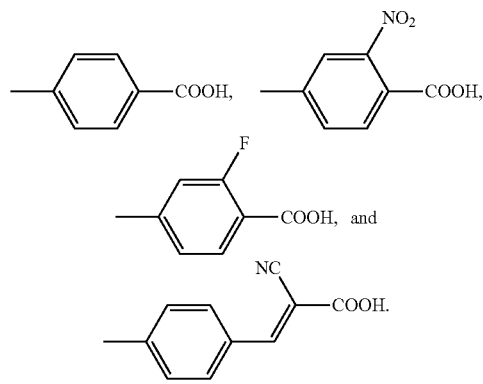

Although the organic photosensitizing dye represented by Formula A may be applied in the dye-sensitized photovoltaic cell, the wavelength range of the light which may be absorbed by the organic photosensitizing dye represented by Formula A is relatively narrow such that the dye-sensitized photovoltaic cell containing the organic photosensitizing dye may not produce a satisfactorily high photoelectric current.

It is thus desirable in the art to develop an organic photosensitizing dye which may absorb visible light over a relatively wide wavelength range.

SUMMARY

An object of the disclosure is to provide an anthracene-based organic dye which may absorb visible light across substantially the entire wavelength range.

According to the disclosure, there is provided an anthracene-based organic dye represented by Formula (1):

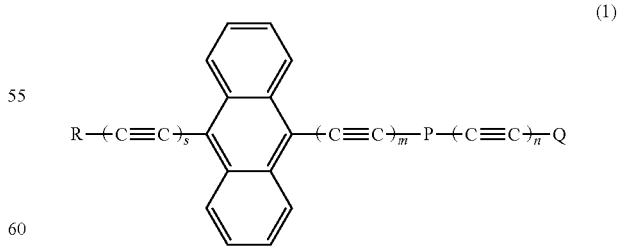

(1)

wherein
s, m, and n represent independently 0 or 1;
Q is an anchoring group;
P is an electron acceptor group selected from the group consisting of

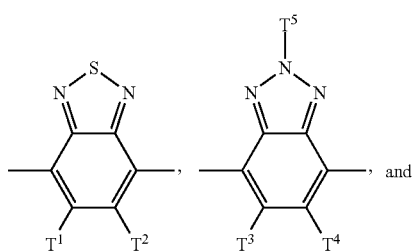

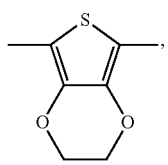

wherein $T^1$, $T^2$, $T^3$, and $T^4$ are independently selected from the group consisting of hydrogen, fluoro, a $C_4$-$C_{12}$ alkyl group, and a $C_4$-$C_{12}$ alkoxy group, and $T^5$ is selected from the group consisting of hydrogen and a $C_4$-$C_{12}$ alkyl group; and R is an electron donor group with the proviso that R is selected from the group consisting of

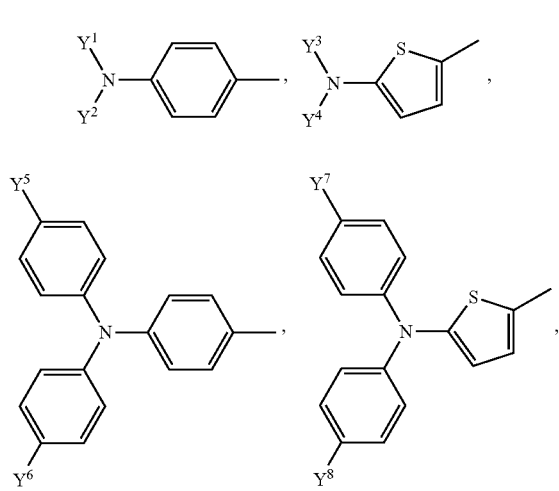

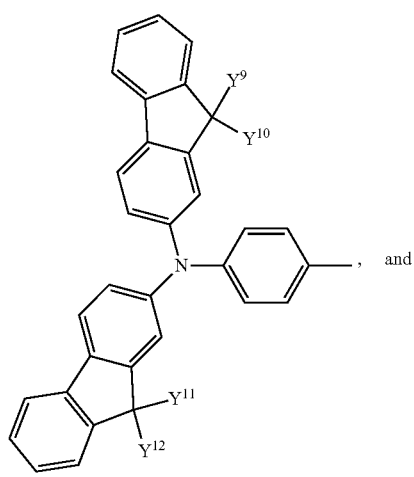

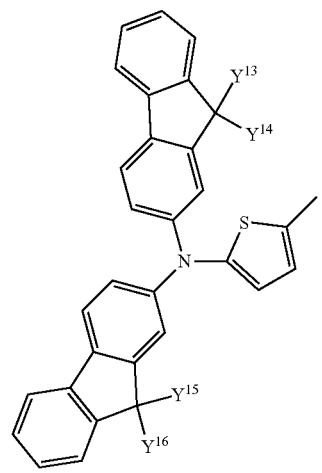

when s represents 1, and

R is selected from the group consisting of

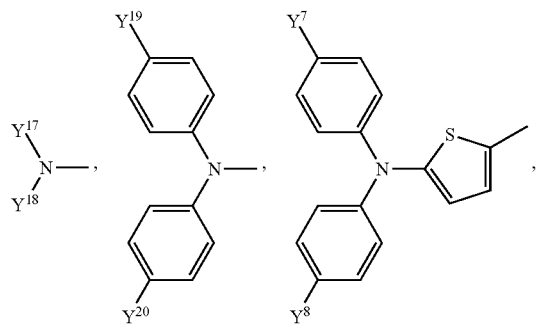

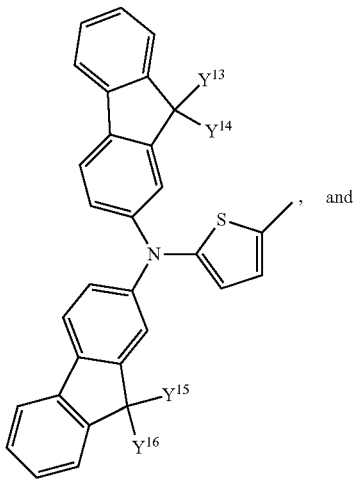

-continued

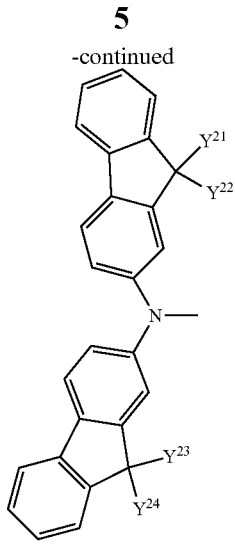

when s represents 0,
wherein
$Y^1, Y^2, Y^3, Y^4, Y^9, Y^{10}, Y^{11}, Y^{12}, Y^{13}, Y^{14}, Y^{15}, Y^{16}, Y^{17}, Y^{18}, Y^{21}, Y^{22}, Y^{23}$, and $Y^{24}$ are independently selected from the group consisting of hydrogen and a $C_4$-$C_{12}$ alkyl group, and
$Y^5, Y^6, Y^7, Y^8, Y^{19}$, and $Y^{20}$ are independently selected from the group consisting of hydrogen, a $C_4$-$C_{12}$ alkyl group, and a $C_4$-$C_{12}$ alkoxy group.

BRIEF DESCRIPTION OF THE DRAWINGS

Other features and advantages of the disclosure will become apparent in the following detailed description of the embodiment(s) with reference to the accompanying drawings, of which:

FIG. 1 is a graph showing an incident photo-to-current efficiency (IPCE) spectrum of a dye-sensitized photovoltaic cell containing an anthracene-based organic dye prepared in Example 1.

DETAILED DESCRIPTION

An anthracene-based organic dye of the disclosure is represented by Formula (1):

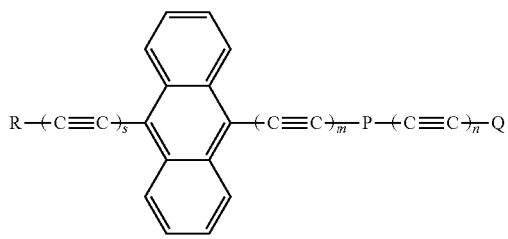

(1)

wherein
s, m, and n represent independently 0 or 1;
Q is an anchoring group;
P is an electron acceptor group selected from the group consisting of

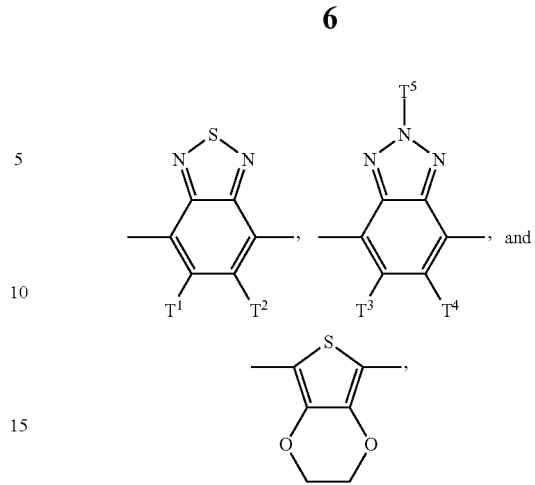

wherein $T^1$, $T^2$, $T^3$, and $T^4$ are independently selected from the group consisting of hydrogen, fluoro, a $C_4$-$C_{12}$ alkyl group, and a $C_4$-$C_{12}$ alkoxy group, and $T^5$ is selected from the group consisting of hydrogen and a $C_4$-$C_{12}$ alkyl group; and R is an electron donor group with the proviso that
R is selected from the group consisting of

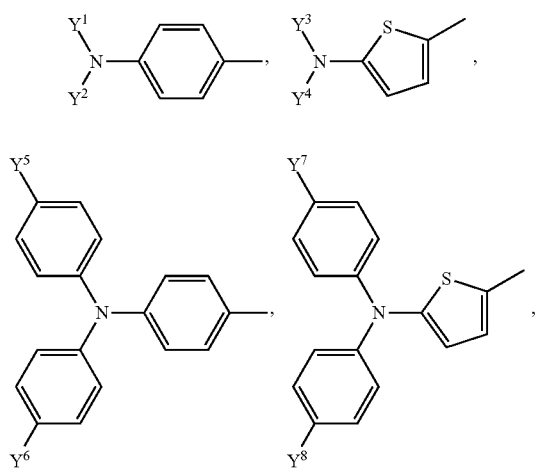

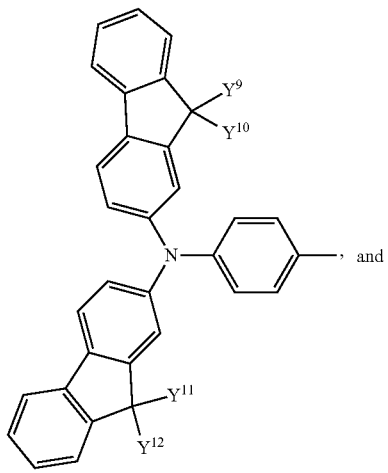

-continued

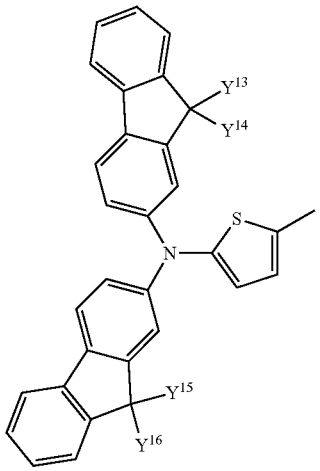

when s represents 1, and
R is selected from the group consisting of

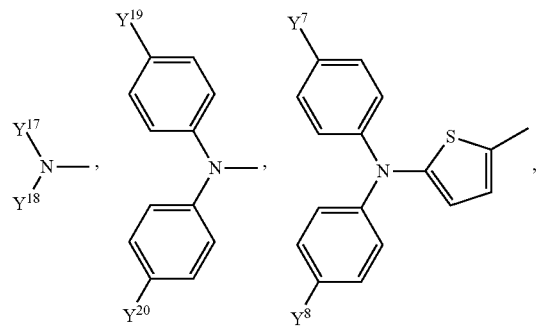

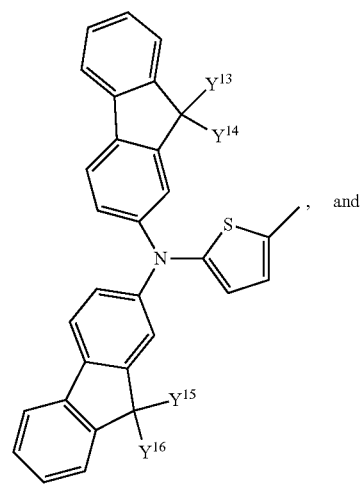

and

-continued

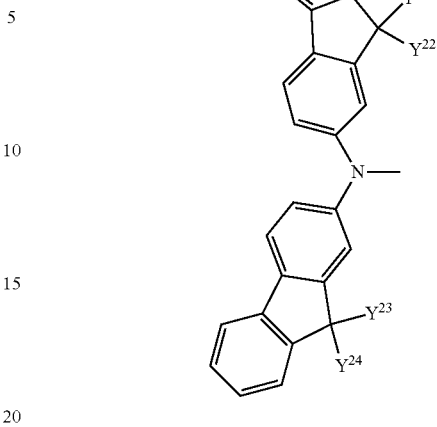

when s represents 0,
wherein
Y$^1$, Y$^2$, Y$^3$, Y$^4$, Y$^9$, Y$^{10}$, Y$^{11}$, Y$^{12}$, Y$^{13}$, Y$^{14}$, Y$^{15}$, Y$^{16}$, Y$^{17}$, Y$^{18}$, Y$^{21}$, Y$^{22}$, Y$^{23}$, and Y$^{24}$ are independently selected from the group consisting of hydrogen and a C$_4$-C$_{12}$ alkyl group, and
Y$^5$, Y$^6$, Y$^7$, Y$^8$, Y$^{19}$, and Y$^{20}$ are independently selected from the group consisting of hydrogen, a C$_4$-C$_{12}$ alkyl group, and a C$_4$-C$_{12}$ alkoxy group.

In Formula (1), P is an electron acceptor group and R is an electron donor group. With the cooperation of the electron acceptor group and the electron donor group, the wavelength range of the light absorbable by the anthracene-based organic dye of the disclosure may be expanded, and the photoelectric conversion efficiency of a dye-sensitized photovoltaic cell containing the anthracene-based organic dye of the disclosure may be enhanced.

Q in Formula (1) is an anchoring group for permitting the anthracene-based organic dye of the disclosure to effectively bind to a working electrode of the dye-sensitized photovoltaic cell and for enhancing the photoelectric conversion efficiency of the dye-sensitized photovoltaic cell containing the anthracene-based organic dye of the disclosure in long-term use. In certain embodiments, Q is selected from the group consisting of

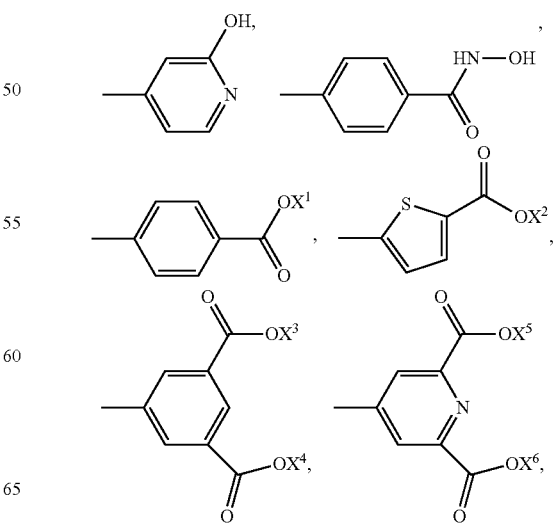

-continued

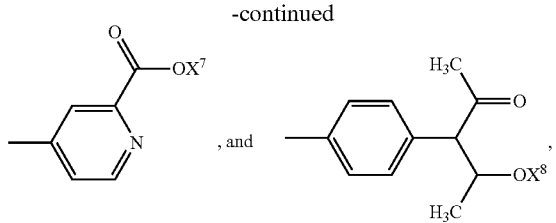, and wherein $X^1$, $X^2$, $X^3$, $X^4$, $X^5$, $X^6$, $X^7$, and $X^8$ are independently selected from the group consisting of hydrogen, lithium, sodium, and

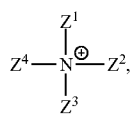

wherein $Z^1$, $Z^2$, $Z^3$, and $Z^4$ represent independently a $C_1$-$C_6$ alkyl group.

In certain embodiments, s and m represent independently 1, and n represents 0 or 1.

In certain embodiments, P represents

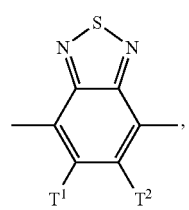

wherein $T^1$ and $T^2$ are independently selected from the group consisting of hydrogen, fluoro, a $C_4$-$C_{12}$ alkyl group, and a $C_4$-$C_{12}$ alkoxy group.

In certain embodiments, R represents

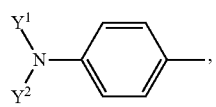

wherein $Y^1$ and $Y^2$ are independently selected from the group consisting of hydrogen and a $C_4$-$C_{12}$ alkyl group.

In certain embodiments, Q represents

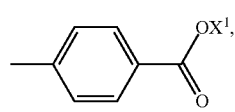

wherein $X^1$ is selected from the group consisting of hydrogen, lithium, sodium, and

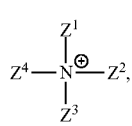

wherein $Z^1$, $Z^2$, $Z^3$, and $Z^4$ represent independently a $C_1$-$C_6$ alkyl group.

In certain embodiments, s and n represent independently 0, and m represents 1.

In certain embodiments, R represents

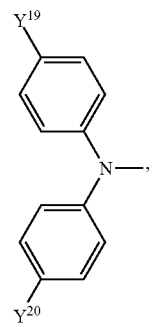

wherein $Y^{19}$ and $Y^{20}$ are independently selected from the group consisting of hydrogen, a $C_4$-$C_{12}$ alkyl group, and a $C_4$-$C_{12}$ alkoxy group.

In certain embodiments, P represents

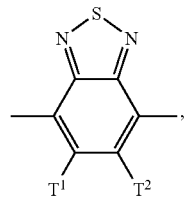

wherein $T^1$ and $T^2$ are independently selected from the group consisting of hydrogen, fluoro, a $C_4$-$C_{12}$ alkyl group, and a $C_4$-$C_{12}$ alkoxy group.

In certain embodiments, Q represents

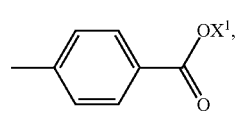

wherein $X^1$ is selected from the group consisting of hydrogen, lithium, sodium, and

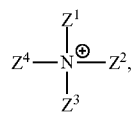

wherein $Z^1$, $Z^2$, $Z^3$, and $Z^4$ represent independently a $C_1$-$C_6$ alkyl group.

The anthracene-based organic dye of the disclosure prepared in the following illustrative examples includes

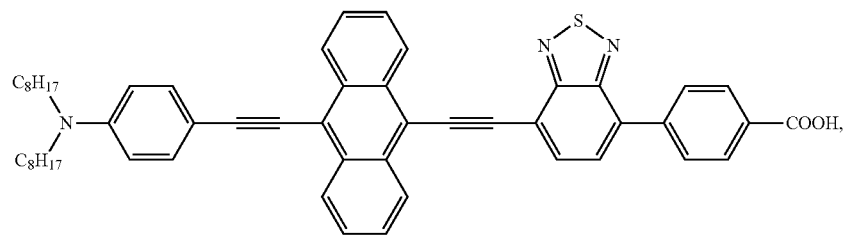

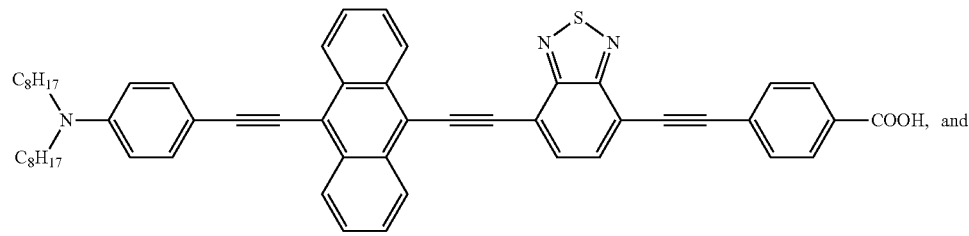

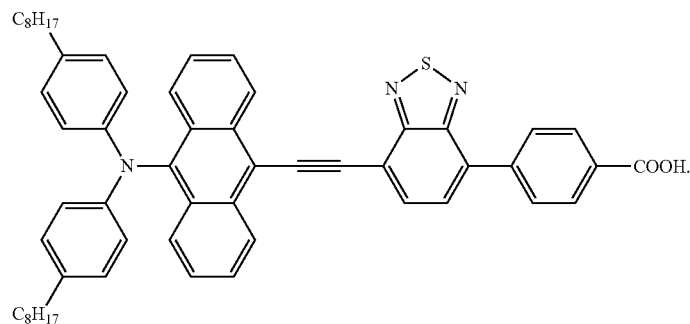

Examples of the disclosure will be described hereinafter. It is to be understood that these examples are exemplary and explanatory and should not be construed as a limitation to the disclosure.

Example 1

Preparation of an Anthracene-Based Compound (Compound A):

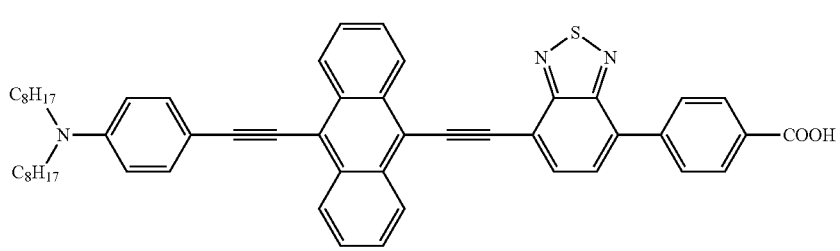

Preparation of Compound A-1:

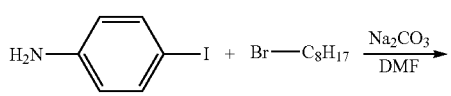

-continued

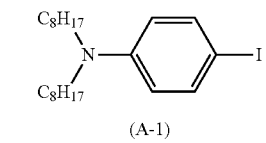

(A-1)

4-iodoaniline (30.0 g, 136.97 mmol), 1-bromooctane (73.5 ml), sodium carbonate (25.5 g, 28.27 mmol), and dimethylformamide (50 ml) were added into a round bottom bottle to obtain a reaction mixture. The reaction mixture was heated to a temperature of 120° C., followed by reaction at the temperature for 14 hours to obtain a reaction product. The reaction product was cooled to 25° C., and was then dissolved in a proper volume amount of n-hexane. The reaction product was then extracted by adding an aqueous solution of NH$_4$Cl in a volume amount equal to that of n-hexane to obtain an organic phase. The organic phase was dried using anhydrous sodium sulfate, followed by evacuation to obtain a coarse product. The coarse product was purified by column chromatography on a silica gel column using a 7:1 v/v mixture of n-hexane and methylene chloride as an eluent to obtain 4-iodo-N,N-dioctylaniline (Compound A-1, 42.5 g, light yellow liquid, yield: 69.9%). Spectrum analysis for Compound A-1: $^1$H NMR (CDCl$_3$, 300 MHz), δ (ppm): 8.20 (d, J=8.4 Hz, 2H); 7.97 (d, J=8.7 Hz, 2H); 7.95 (d, J=7.7 Hz, 1H); 7.64 (d, J=7.6 Hz, 1H); 3.97 (s, 3H).

Preparation of Compound A-2:

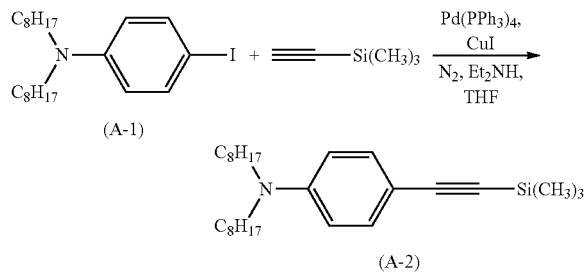

Compound A-1 (15.5 g, 34.95 mmol), (trimethylsilyl)acetylene (14.9 ml, 104.85 mmol), and diethylamine (35 ml) were added into a Schlenk flask, followed by addition of anhydrous tetrahydrofuran (THF, 35 mL) as a solvent to obtain a mixture. The mixture was degassed using a freeze/thaw cycle (three times), and was then added with Pd(PPh$_3$)$_4$ (202 mg, 0.5 mol %) and copper (I) iodide (CuI, 33 mg, 0.5 mol %) within a water-free and oxygen-free glove box to obtain a reaction mixture, which was subjected to a reaction in an oil bath at 50° C. for 16 hours to obtain a reaction product. The reaction product was concentrated under reduced pressure to remove THF and diethylamine, and was dissolved in a proper volume amount of n-hexane, followed by extraction using an aqueous solution of NH$_4$Cl in a volume amount equal to that of n-hexane to obtain an organic phase. The organic phase was dried using anhydrous sodium sulfate, followed by evacuation to obtain a coarse product. The coarse product was purified by column chromatography on a silica gel column using n-hexane as an eluent to obtain 4-[2-(trimethylsilyl)ethynyl]-N,N-dioctylaniline (Compound A-2, 14.2 g, light yellow liquid, yield: 98.0%). Spectrum analysis for Compound A-2: $^1$H NMR (CDCl$_3$, 300 MHz), δ (ppm): 7.29 (d, J=9.0 Hz, 2H); 6.50 (d, J=9.0 Hz, 2H); 3.24 (t, J=7.7 Hz, 4H); 1.55 (t, J=5.2 Hz, 4H); 1.40-1.20 (m, overlapped, 20H); 0.89 (t, J=6.8 Hz, 6H); 0.23 (s, 9H).

Preparation of Compound A-3:

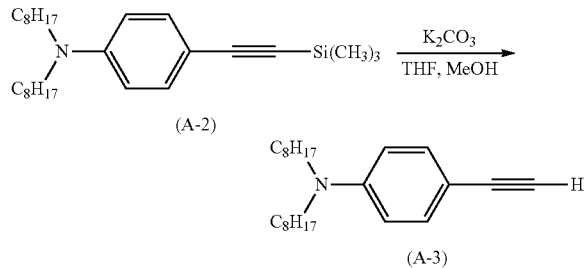

Compound A-2 (14.2 g, 34.25 mmol) was dissolved in a solvent mixture composed of THF (100 ml) and methanol (100 ml), followed by addition of K$_2$CO$_3$ (14.5 g) to obtain a reaction mixture. The reaction mixture was allowed to react under a nitrogen atmosphere at 25° C. for 1.5 hours to obtain a reaction product. The reaction product was concentrated under reduced pressure to remove THF and methanol, and was dissolved in a proper volume amount of n-hexane, followed by extraction using an aqueous solution of NH$_4$Cl in a volume amount equal to that of n-hexane to obtain an organic phase. The organic phase was dried using anhydrous sodium sulfate, followed by evacuation to obtain a coarse product. The coarse product was purified by column chromatography on a silica gel column using n-hexane as an eluent to obtain 4-ethynyl-N,N-dioctylaniline (Compound A-3, 11.3 g, yield: 96.9%). Spectrum analysis for Compound A-3: $^1$H NMR (CDCl$_3$, 300 MHz), δ (ppm): 7.32 (d, J=8.9 Hz, 2H); 6.52 (d, J=8.9 Hz, 2H); 3.25 (t, J=7.7 Hz, 4H); 1.56 (t, J=7.3 Hz, 4H); 1.40-1.20 (m, overlapped, 20H); 0.89 (t, J=6.6 Hz, 6H).

Preparation of Compound A-4:

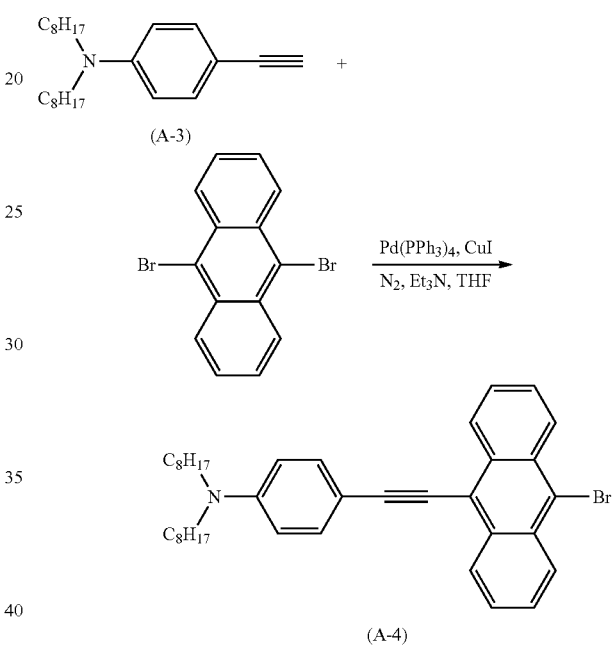

Compound A-3 (6.3 g, 18.44 mmol), 9,10-dibromoanthracene (5.2 g, 15.39 mmol), and triethylamine (30 ml) were added into a round bottom bottle, followed by addition of anhydrous THF (150 mL) as a solvent to obtain a mixture. Pd(PPh$_3$)$_4$ (426 mg, 2 mol %) and CuI (70 mg, 2 mol %) were added to the mixture under a nitrogen atmosphere to obtain a reaction mixture, which was subjected to a reaction in an oil bath at 70° C. for 16 hours to obtain a reaction product. The reaction product was concentrated under reduced pressure to remove anhydrous THF and triethylamine, and was dissolved in a proper volume amount of n-hexane, followed by extraction using an aqueous solution of NH$_4$Cl in a volume amount equal to that of n-hexane to obtain an organic phase. The organic phase was dried using anhydrous sodium sulfate, followed by evacuation to obtain a coarse product. The coarse product was purified by column chromatography on a silica gel column using n-hexane as an eluent to obtain 4-[2-(10-bromoanthracen-9-yl)ethynyl]-N,N-dioctyl-benzenamine (Compound A-4, 4.5 g, orange solid, yield: 51.2%). Spectrum analysis for Compound A-4: $^1$H NMR (CDCl$_3$, 300 MHz), δ (ppm): 8.72 (d, J=8.2 Hz, 2H); 8.55 (d, J=8.5 Hz, 2H); 7.67-7.55 (m, overlapped, 6H); 6.67 (d, J=8.7 Hz, 2H); 3.32 (t, J=7.6 Hz, 4H); 1.62 (t, J=7.1 Hz, 4H); 1.42-1.21 (m, overlapped, 20H); 0.90 (t, J=6.1 Hz, 6H).

Preparation of Compound A-7:

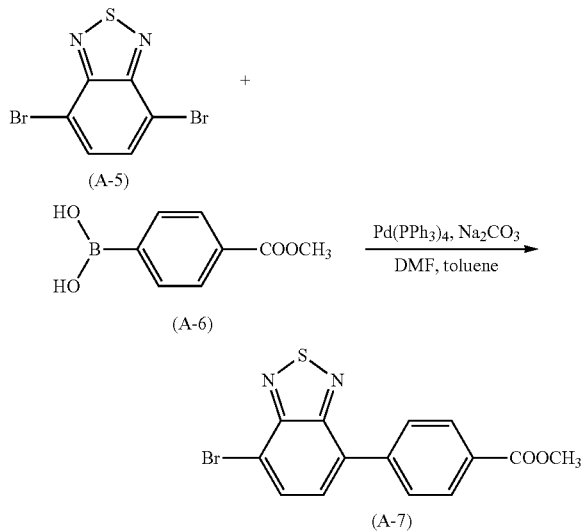

Compound A-5 (3.0 g, 10.27 mmol), Compound A-6 (1.8 g, 10.16 mmol), cesium carbonate (1.6 g, 8.89 mmol), dimethylformamide (60 ml), and toluene (60 ml) were added into a round bottom bottle to obtain a reaction mixture. The reaction mixture was heated under reflux, followed by reaction under a nitrogen atmosphere for 14 hours to obtain a reaction product. The reaction product was cooled to 25° C., followed by evacuation of residual toluene. The reaction product was then added slowly into double-distilled water to conduct reprecipitation, followed by filtration to obtain a cake. The cake was dissolved in a proper volume amount of ethyl acetate, followed by extraction using an aqueous solution of $NH_4Cl$ in a volume amount equal to that of ethyl acetate to obtain an organic phase. The organic phase was dried using anhydrous sodium sulfate, followed by evacuation to obtain a coarse product. The coarse product was purified by column chromatography on a silica gel column using a 5:1 v/v mixture of n-hexane and THF as an eluent to obtain Compound A-7 (2.1 g, light yellow solid, yield: 58.0%). Spectrum analysis for Compound A-7: $^1$H NMR ($CDCl_3$, 300 MHz), δ (ppm): 8.20 (d, J=8.4 Hz, 2H); 7.97 (d, J=8.7 Hz, 2H); 7.95 (d, J=7.7 Hz, 1H); 7.64 (d, J=7.6 Hz, 1H); 3.97 (s, 3H).

Preparation of Compound A-8:

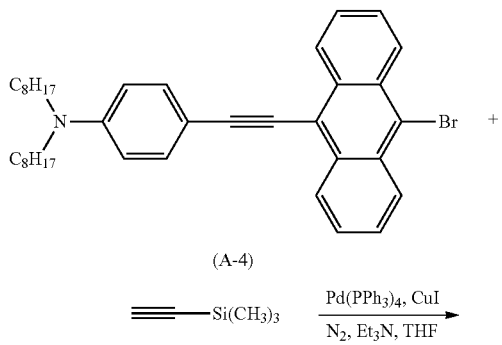

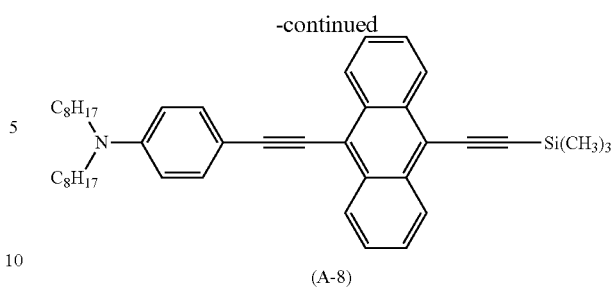

Compound A-4 (852 mg, 0.14 mmol), (trimethylsilyl)acetylene (0.6 ml, 0.43 mmol), and triethylamine (10 mL) were added into a Schlenk flask, followed by addition of anhydrous THF (70 mL) as a solvent to obtain a mixture. The mixture was degassed using a freeze/thaw cycle (three times), and $Pd(PPh_3)_4$ (89 mg, 10 mol %) and CuI (15 mg, 10 mol %) were added thereto within a water-free and oxygen-free glove box to obtain a reaction mixture, which was subjected to a reaction in an oil bath at 50° C. for 72 hours to obtain a reaction product. The reaction product was concentrated under reduced pressure to remove THF and triethylamine, and was then dissolved in a proper volume amount of methylene chloride, followed by extraction using an aqueous solution of $NH_4Cl$ in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 1:7 v/v mixture of methylene chloride and n-hexane as an eluent to obtain Compound A-8 (876 mg, yellow oil, yield: 100%). Spectrum analysis for Compound A-8: $^1$H NMR ($CDCl_3$, 300 MHz), δ (ppm): 8.69 (d, J=7.4 Hz, 2H); 8.57 (d, J=9.5 Hz, 2H); 7.60 (d, J=9.4 Hz, 6H); 6.67 (d, J=8.8 Hz, 2H); 3.44-3.18 (m, 4H); 1.62 (s, 4H); 1.44-1.28 (m, overlapped, 20H); 0.90 (t, J=6.2 Hz, 6H); 0.43 (s, 9H).

Preparation of Compound A-9:

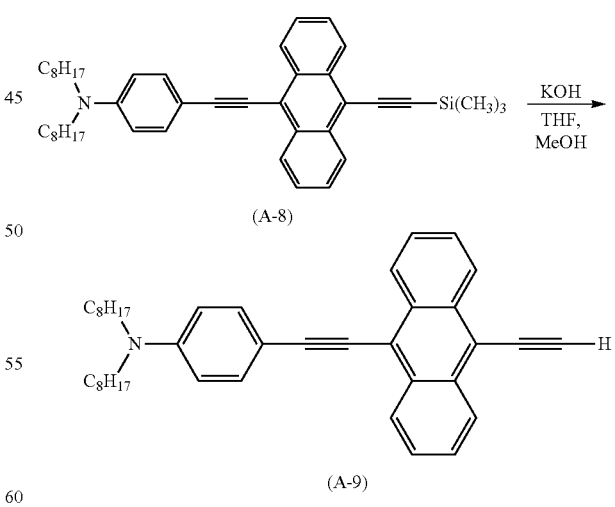

Compound A-8 (876 mg, 1.43 mmol) was dissolved in a solvent mixture composed of THF (80 ml) and methanol (20 ml), followed by addition of an aqueous solution of KOH (2 ml, 2 M) to obtain a reaction mixture. The reaction mixture was allowed to react under a nitrogen atmosphere at 25° C. for 2 hours to obtain a reaction product. The reaction product was concentrated under reduced pressure to remove THF and methanol, and was dissolved in a proper volume amount of methylene chloride, followed by extraction using an aqueous solution of NH$_4$Cl in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 1:7 v/v mixture of methylene chloride and n-hexane as an eluent to obtain Compound A-9 (563 mg, dark yellow oil, yield: 73%). Spectrum analysis for Compound A-9: $^1$H NMR (CDCl$_3$, 300 MHz), δ (ppm): 8.72-8.69 (m, 2H); 8.61-8.58 (m, 2H); 7.62-7.59 (m, overlapped, 6H); 6.67 (d, J=8.5 Hz, 2H); 4.05 (s, 1H); 3.33 (t, J=7.4 Hz, 4H); 1.42-1.22 (m, overlapped, 20H); 0.90 (t, J=6.2 Hz, 6H).

Preparation of Compound A-10:

glove box to obtain a reaction mixture, which was subjected to a reaction in an oil bath at 50° C. for 20 hours to obtain a reaction product. The reaction product was concentrated under reduced pressure to remove THF and triethylamine, and was then dissolved in a proper volume amount of methylene chloride, followed by extraction using an aqueous solution of NH$_4$Cl in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 3:1 v/v mixture of n-hexane and THF as an eluent to obtain a preliminarily purified product. The preliminarily purified product was dissolved in methylene chloride, followed by recrystallization by adding a proper volume amount of methanol to obtain Compound A-10 (300 mg, dark red needle crystal, yield: 70%). Spectrum analysis

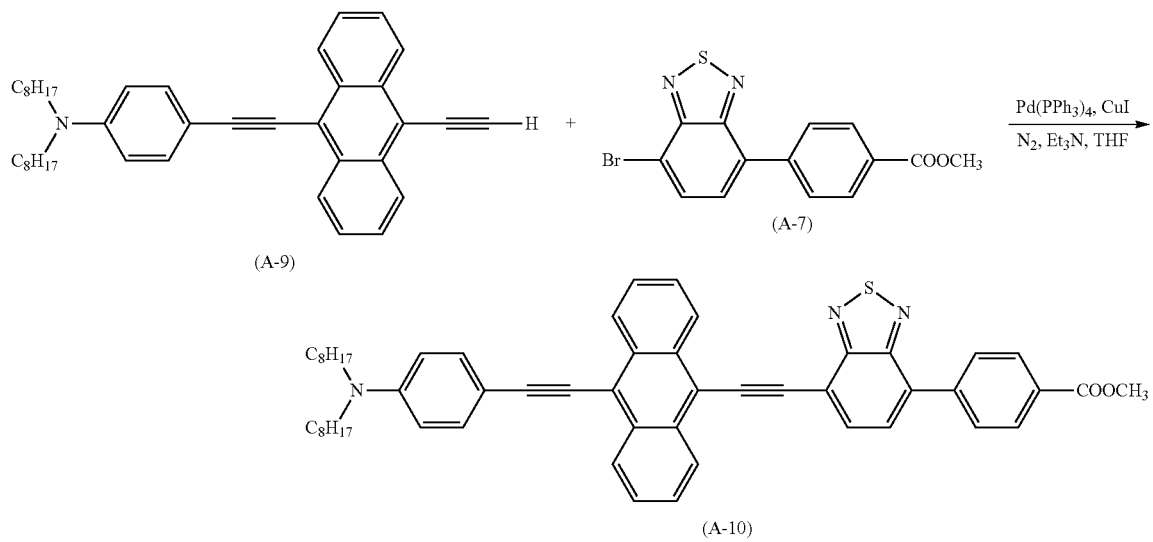

Compound A-9 (0.321 g, 0.59 mmol), Compound A-7 (186 mg, 0.50 mmol), and triethylamine (10 mL) were added into a Schlenk flask, followed by addition of anhydrous THF (70 mL) as a solvent to obtain a mixture. The mixture was degassed using a freeze/thaw cycle (three times), and Pd(PPh$_3$)$_4$ (69 mg, 10 mol %) and CuI (11 mg, 10 mol %) were added thereto within a water-free and oxygen-free for Compound A-10: $^1$H NMR (CDCl$_3$, 300 MHz), δ (ppm): 8.95 (d, J=8.7 Hz, 2H); 8.75 (d, J=8.4 Hz, 2H); 8.24 (d, J=8.5 Hz, 2H); 8.11 (d, J=8.9 Hz, 2H); 7.86 (d, J=7.4 Hz, 1H); 7.78-7.55 (m, 7H); 6.68 (d, J=9.2 Hz, 2H); 3.99 (s, 3H); 3.47-3.19 (m, 4H); 1.59 (s, 4H), 1.40-1.22 (m, overlapped, 20H); 1.02-0.78 (m, 6H).

Preparation of Compound A:

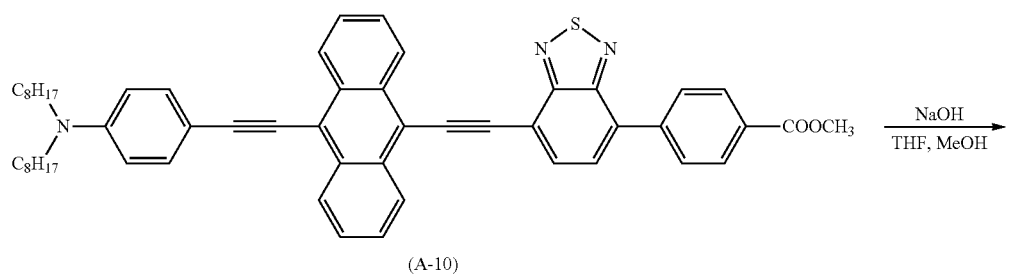

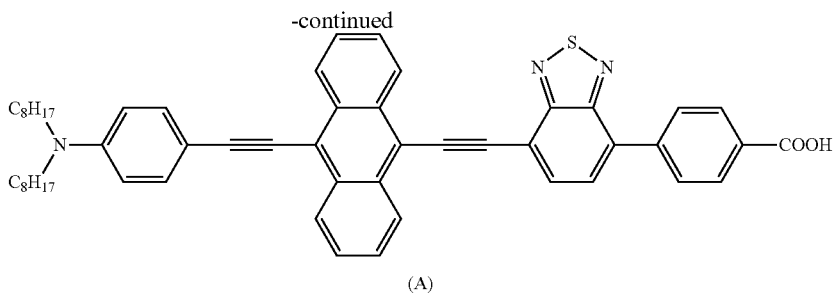

(A)

Compound A-10 (152 mg), THF (100 ml), methanol (100 ml), and NaOH (8.33 M, 20 ml) were added into a round bottom bottle to obtain a reaction mixture. The reaction mixture was heated under reflux to conduct a reaction for 1 hour to obtain a reaction product. The reaction product was concentrated under reduced pressure to remove THF and methanol, followed by neutralization by adding concentrated hydrochloric acid and filtration with suction to obtain a cake. The cake was purified by column chromatography on a silica gel column using a 9:1 v/v mixture of methylene chloride and methanol as an eluent to obtain a preliminarily purified product. The preliminarily purified product was dissolved in methylene chloride, followed by recrystallization by adding a proper volume amount of methanol to obtain Compound A (131 mg, golden gray solid, yield: 88%). Spectrum analysis for Compound A: $^1$H NMR ($D_6$-DMSO, 300 MHz), δ (ppm): 8.90 (d, J=8.4 Hz, 2H); 8.65 (d, J=8.3 Hz, 2H); 8.29 (d, J=7.6 Hz, 1H); 8.20 (d, J=8.5 Hz, 2H); 8.12 (d, J=8.5 Hz, 2H); 8.06 (d, J=7.5 Hz, 1H); 7.9-7.72 (m, 4H); 7.60 (d, J=8.4 Hz, 2H); 6.71 (d, J=8.8 Hz, 2H); 1.54 (s, 4H); 1.28 (d, J=11.4 Hz, 20H); 0.85 (d, J=6.3 Hz, 6H). Elemental analysis: theoretical value for $C_{53}H_{53}N_3O_2S \cdot 0.5H_2O$: C, 79.07%; H, 6.76%: N, 5.22%; found: C, 79.20%; H, 6.74%; N, 5.23%. MALDI-TOF: theoretical value 795.39 [M$^+$]; found 795.42 [M$^+$].

Example 2

Preparation of an Anthracene-Based Organic Dye (Compound B):

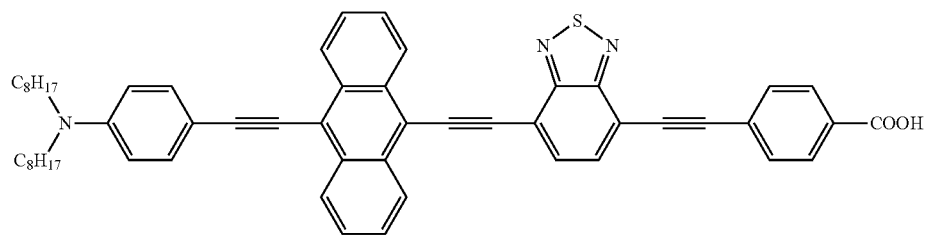

Preparation of Compound B-1:

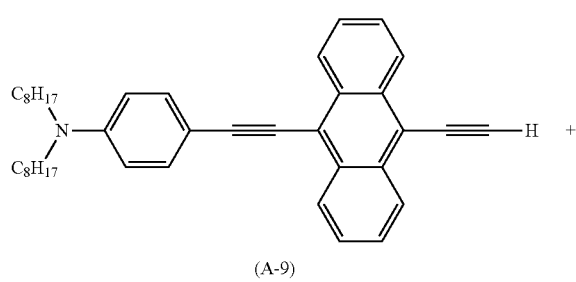

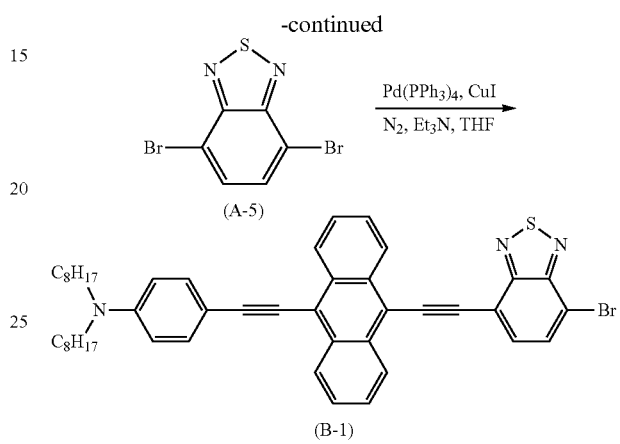

Compound A-9 (255 mg, 0.47 mmol), Compound A-5 (415 mg, 1.43 mmol), and triethylamine (5 mL) were added into a Schlenk flask, followed by addition of anhydrous THF (30 mL) as a solvent to obtain a mixture. The mixture was degassed using a freeze/thaw cycle (three times), and Pd(PPh$_3$)$_4$ (54 mg, 10 mol %) and CuI (9 mg, 10 mol %) were added thereto within a water-free and oxygen-free glove box to obtain a reaction mixture, which was subjected to a reaction in an oil bath at 50° C. for 36 hours to obtain a reaction product. The reaction product was concentrated under reduced pressure to remove THF and triethylamine, and was then dissolved in a proper volume amount of methylene chloride, followed by extraction using an aqueous solution of NH$_4$Cl in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 10:1 v/v mixture of n-hexane and THF as an eluent to obtain a preliminarily purified product. The preliminarily purified product was dissolved in methylene chloride, followed by recrystallization by adding a proper volume amount of methanol to obtain Compound B-1 (100 mg, golden gray, yield: 28%). Spectrum analysis for Compound B-1: $^1$H NMR (CDCl$_3$, 300 MHz), δ (ppm): 8.87 (d, J=8.1 Hz, 2H); 8.73 (d, J=0.3 Hz, 2H); 7.91 (d, J=7.6 Hz, 1H); 7.84 (d, J=7.6 Hz, 1H); 7.76-7.56 (m, 6H); 6.68 (d, J=8.9 Hz, 2H), 3.33 (t, J=7.7 Hz, 4H); 1.72-1.59 (m, 4H); 1.40-1.23 (m, 20H); 0.96-0.83 (m, 6H).

Preparation of Compound B:

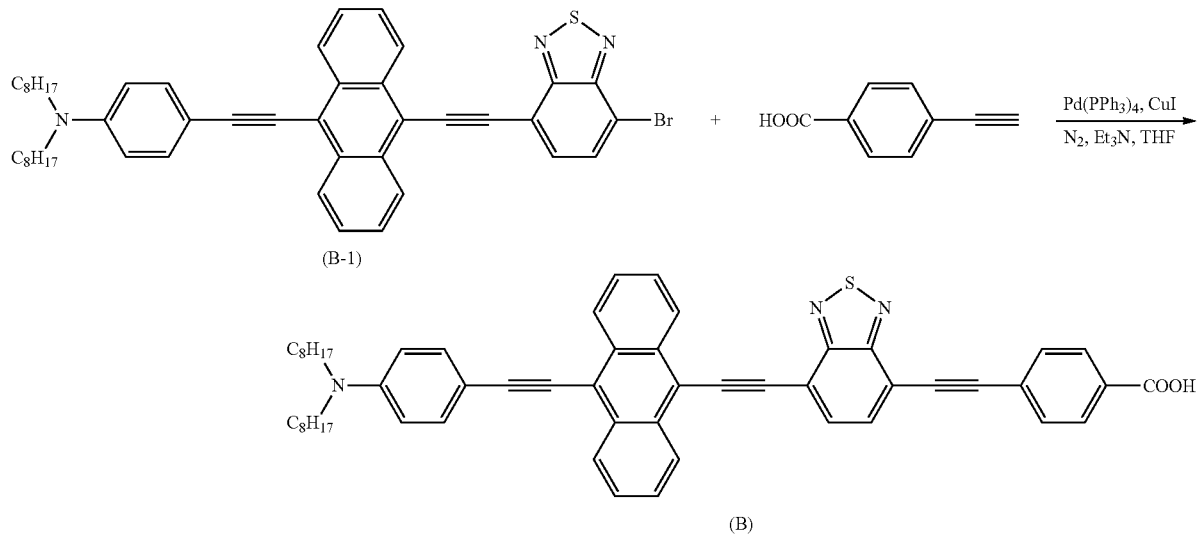

Compound B-1 (50 mg, 0.07 mmol), 4-ethynylbenzoic acid (29 mg, 0.18 mmol), and triethylamine (5 mL) were added into a Schlenk flask, followed by addition of anhydrous THF (30 mL) as a solvent to obtain a mixture. The mixture was degassed using a freeze/thaw cycle (three times), and Pd(PPh$_3$)$_4$ (54 mg, 10 mol %) and CuI (9 mg, 10 mol %) were added thereto within a water-free and oxygen-free glove box to obtain a reaction mixture, which was subjected to a reaction in an oil bath at 50° C. for 48 hours to obtain a reaction product. The reaction product was concentrated under reduced pressure to remove THF and triethylamine to obtain a coarse product. The coarse product was purified by column chromatography on a silica gel column using a 9:1 v/v mixture of methylene chloride and methanol as an eluent to obtain a preliminarily purified product. The preliminarily purified product was dissolved in THF, followed by recrystallization by adding a proper volume amount of methanol to obtain Compound B (41 mg, golden gray solid, yield: 76%). Spectrum analysis for Compound B: $^1$H NMR (CDCl$_3$, 300 MHz), δ (ppm): 8.92 (d, J=9.0 Hz, 2H); 8.69 (d, J=9.0 Hz, 2H); 8.32 (d, J=7.8 Hz, 1H); 8.10 (d, J=7.8 Hz, 1H); 8.01-7.94 (m, 2H); 7.90-7.76 (m, 4H); 7.66 (d, J=9.0 Hz, 2H); 6.75 (m, J=8.5 Hz, 2H); 1.65-1.47 (m, 4H); 1.41-1.18 (m, 20H); 0.94-0.77 (m, 6H). Elemental analysis: theoretical value for C$_{55}$H$_{53}$N$_3$O$_2$S.1.5H$_2$O: C, 77.98%; H, 6.66%; N, 4.96%; found: C, 77.98%; H, 6.74%; N, 5.15%. MALDI-TOF: theoretical value 819.39 [M$^+$]; found 819.55 [M$^+$].

Example 3

Preparation of an Anthracene-Based Organic Dye (Compound C):

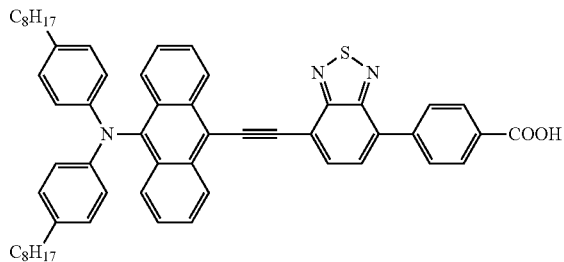

Preparation of Compound C-3:

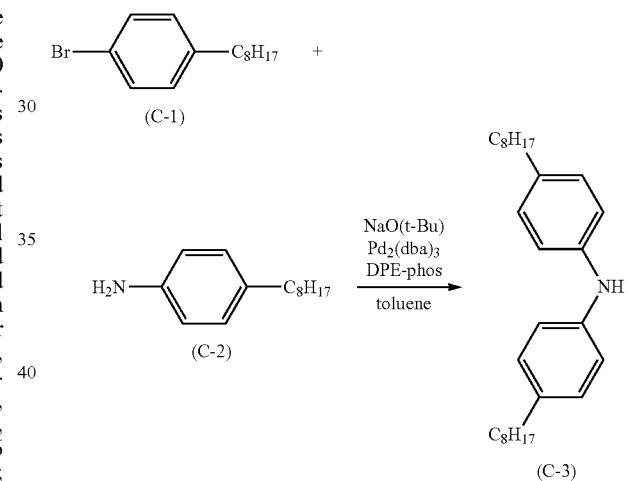

Compound C-1 (1.0 g, 3.71 mmol), Compound C-2 (839 mg, 1.43 mmol), and toluene (35 mL) were added into a Schlenk flask to obtain a mixture. The mixture was degassed using a freeze/thaw cycle (three times), and sodium tert-butoxide (NaO(t-Bu), 500 mg, 1.4 eq.) was then added thereto within a water-free and oxygen-free glove box, followed by addition of a catalyst mixture, which was composed of Pd$_2$(dba)$_3$ (102 mg, 3 mol %) and (oxydi-2,1-phenylene)bis(diphenylphosphine) (DPE-phos, 12 mg, 6 mol %) and which was degassed using a freeze/thaw cycle (three times) and was allowed to react at a temperature of 70° C. for 15 minutes to obtain a reaction mixture, which was subjected to a reaction in an oil bath at 70° C. for 3 hours to obtain a reaction product. The reaction product was concentrated under reduced pressure to remove toluene, and was then dissolved in a proper volume amount of methylene chloride, followed by extraction using an aqueous solution of NH$_4$Cl in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 10:1 v/v mixture of n-hexane and ethyl acetate as an eluent to obtain Compound C-3 (1.2 g, light yellow solid, yield: 83.0%). Spectrum analysis for Compound C-3: $^1$H NMR (CDCl$_3$, 300 MHz), δ (ppm): 7.06 (d, J=7.9 Hz, 4H); 6.97 (d, J=7.2 Hz, 4H); 5.54 (s, 1H); 2.54 (t, J=7.5 Hz, 4H); 1.56 (d, J=8.4 Hz, 4H); 0.88 (t, J=6.4 Hz, 6H).

Preparation of Compound C-5:

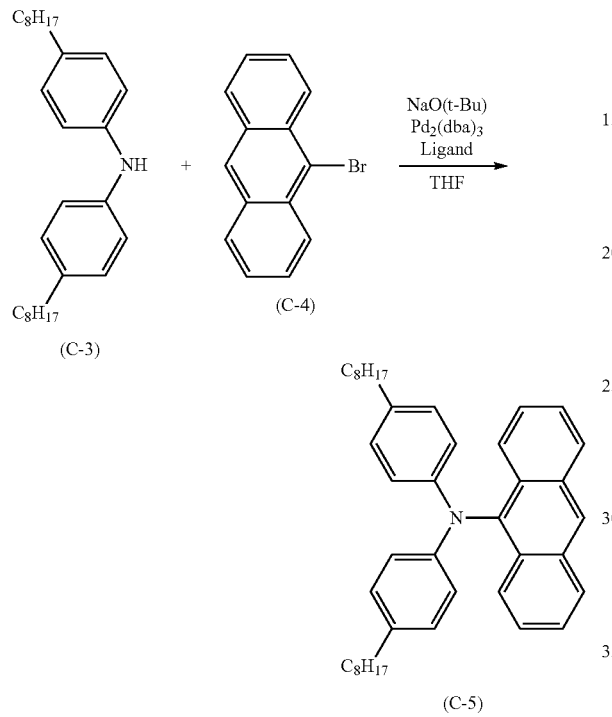

(wherein the ligand has a structure of

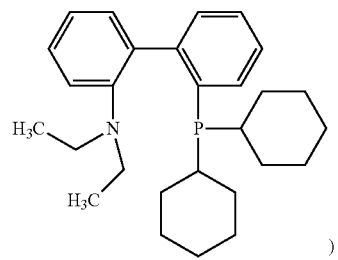 [SMILES: CCN(CC)c1ccccc1-c1ccccc1P(C1CCCCC1)C1CCCCC1]
)

Compound C-4 (58 mg, 2.26 mmol), Compound C-3 (976 mg, 2.48 mmol), and anhydrous THF (35 mL, as a solvent) were added into a Schlenk flask to obtain a mixture. The mixture was degassed using a freeze/thaw cycle (three times), and Pd$_2$(dba)$_3$ (22 mg, 1 mol %), the ligand (53 mg, 6 mol %), and NaO(t-Bu) (607 mg, 2.8 eq.) were added thereto within a water-free and oxygen-free glove box to obtain a reaction mixture, which was subjected to a reaction in an oil bath at 70° C. for 20 hours to obtain a reaction product. The reaction product was concentrated under reduced pressure to remove THF, and was then dissolved in a proper volume amount of methylene chloride, followed by extraction using an aqueous solution of NH$_4$Cl in a volume amount equal to that of methylene chloride to obtain an organic phase. The organic phase was dried using anhydrous sodium sulfate, followed by evacuation to obtain a coarse product. The coarse product was purified by column chromatography on a silica gel column using n-hexane as an eluent to obtain Compound C-5 (428 mg, yield: 34.0%). Spectrum analysis for Compound C-5: $^1$H NMR (CDCl$_3$, 300 MHz) δ (ppm): 8.49 (s, 1H); 8.15 (d, J=8.8 Hz, 2H); 8.05 (d, J=8.0 Hz, 2H); 7.47-7.35 (m, overlapped, 4H); 7.00-6.93 (m, overlapped, 8H); 2.49 (t, J=7.8 Hz, 4H); 1.63-1.48 (m, overlapped, 4H); 1.40-1.17 (m, overlapped, 20H); 0.88 (t, J=6.7 Hz, 6H).

Preparation of Compound C-6:

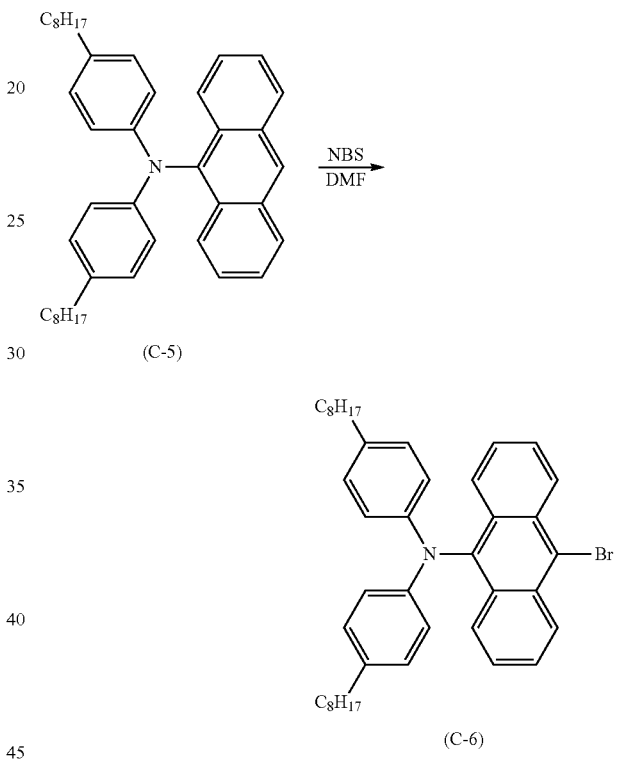

Compound C-5 (645 mg, 0.44 mmol) and THF (40 ml, as a solvent) were added into a round bottom bottle, followed by dropwise addition of a solution of NBS (94 mg, 0.53 mmol) in THF (35 ml) to obtain a reaction mixture. The reaction mixture was allowed to react at a temperature of 25° C. for 16 hours to obtain a reaction product. The reaction product was concentrated under reduced pressure to remove THF, and was then dissolved in a proper volume amount of ether. The reaction product was then extracted by adding an aqueous solution of NH$_4$Cl in a volume amount equal to that of ether to obtain an organic phase. The organic phase was dried using anhydrous sodium sulfate, followed by evacuation to obtain a coarse product. The coarse product was purified by column chromatography on a silica gel column using n-hexane as an eluent to obtain Compound C-6 (567 mg, yield: 82.0%). Spectrum analysis for Compound C-6: $^1$H NMR (CDCl$_3$, 300 MHz) δ (ppm): 8.60 (d, J=8.8 Hz, 2H); 8.20 (d, J=8.7 Hz, 2H); 7.60-7.57 (m, 2H); 7.44-7.39 (m, 2H); 6.95 (s, 8H); 2.48 (t, J=7.8 Hz, 4H); 1.56-1.48 (m, overlapped, 4H); 1.38-1.16 (m, overlapped, 20H); 0.98 (t, J=6.7 Hz, 6H).

Preparation of Compound C-7:

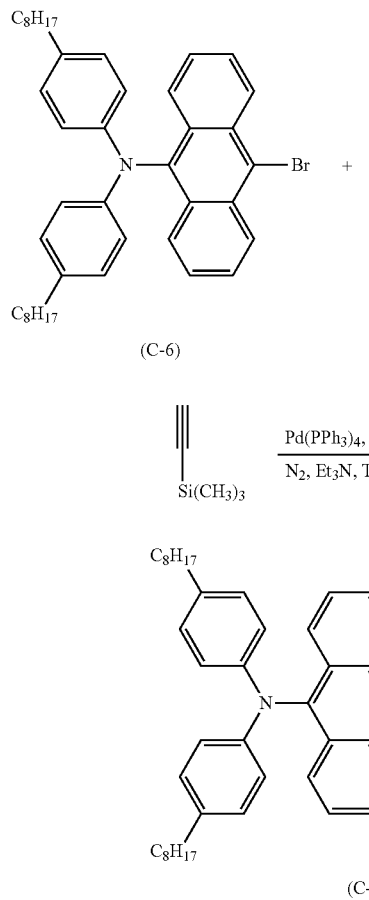

Preparation of Compound C-8:

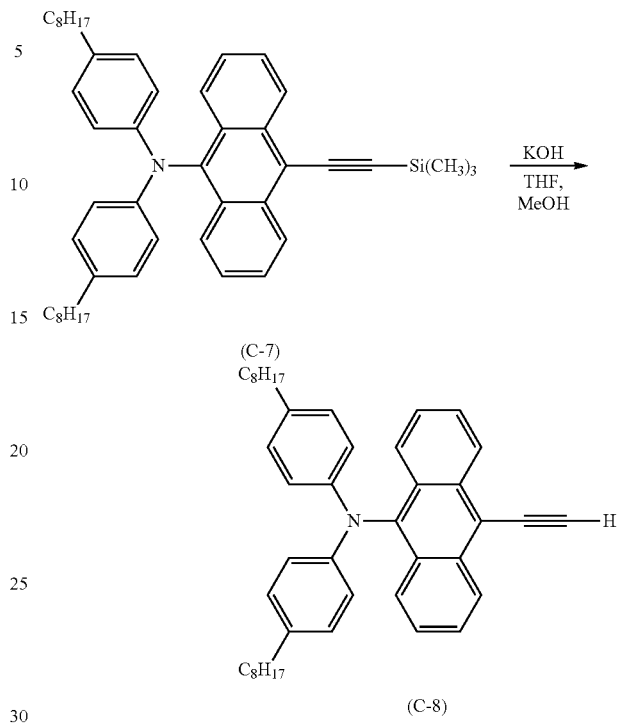

Compound C-6 (634 mg, 0.98 mmol), (trimethylsilyl) acetylene (3 ml, 21.10 mmol), and triethylamine (10 mL) were added into a Schlenk flask, followed by addition of anhydrous THE (30 mL) as a solvent to obtain a mixture. The mixture was degassed using a freeze/thaw cycle (three times), and Pd(PPh$_3$)$_4$ (56 mg, 5 mol %) and CuI (9.33 mg, 5 mol %) were added thereto within a water-free and oxygen-free glove box to obtain a reaction mixture, which was subjected to a reaction in an oil bath at 50° C. for 15 hours to obtain a reaction product. The reaction product was concentrated under reduced pressure to remove THF and triethylamine, and was then dissolved in a proper volume amount of methylene chloride. The reaction product was then extracted by adding an aqueous solution of NH$_4$Cl in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 1:2 v/v mixture of methylene chloride and n-hexane as an eluent to obtain Compound C-7 (594 mg, yield: 99%). Spectrum analysis for Compound C-7: $^1$H NMR (CDCl$_3$, 300 MHz) δ (ppm): 8.63 (d, J=8.6 Hz, 2H); 8.14 (d, J=0.7 Hz, 2H); 7.55 (t, J=7.6 Hz, 2H); 7.40 (t, J=7.6 Hz, 2H); 6.94 (s, 8H); 2.48 (t, J=7.7 Hz, 4H); 1.56-1.48 (m, overlapped, 4H); 1.40-1.16 (m, overlapped, 20H); 0.88 (t, J=6.5 Hz, 6H); 0.45 (s, 9H).

Compound C-7 (262 mg, 0.393 mmol) was dissolved in a solvent mixture composed of THF (80 ml) and methanol (20 ml), followed by addition of an aqueous solution of KOH (2 M, 2 ml) to obtain a reaction mixture. The reaction mixture was allowed to react under a nitrogen atmosphere at 25° C. for 2 hours to obtain a reaction product. The reaction product was concentrated under reduced pressure to remove THF and methanol, and was dissolved in a proper volume amount of methylene chloride, followed by extraction using an aqueous solution of NH$_4$Cl in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 1:2 v/v mixture of methylene chloride and n-hexane as an eluent to obtain Compound C-8 (233 mg, yield: 100.0%). Spectrum analysis for Compound C-8: $^1$H NMR (CDCl$_3$, 300 MHz) δ (ppm): 8.64 (d, J=8.9 Hz, 2H); 8.14 (d, J=8.7 Hz, 2H); 7.54 (t, J=8.0 Hz, 2H); 7.40 (t, J=8.0 Hz, 2H); 6.94 (s, 8H); 4.04 (s, 4H); 2.47 (t, J=8.0 Hz, 4H); 1.25 (s, 24H), 0.88 (s, 6H).

Preparation of Compound C-9:

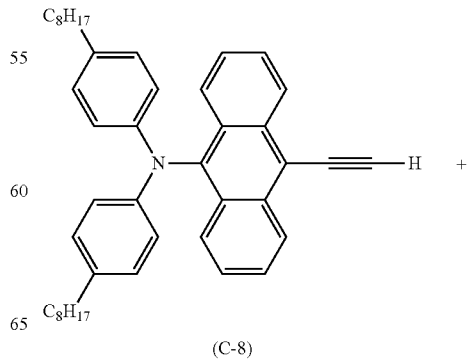

-continued

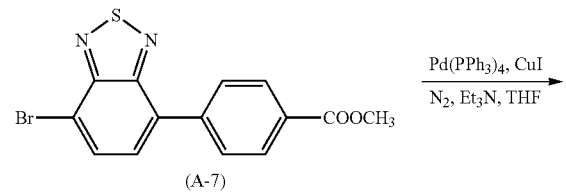

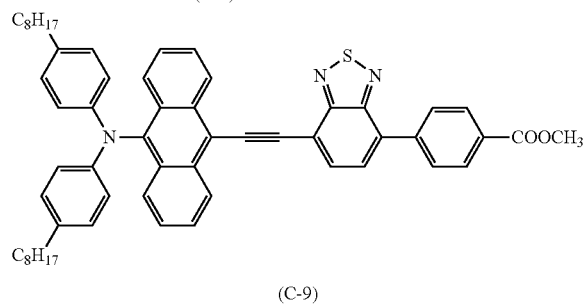

Compound C-8 (233 mg, 0.39 mmol), Compound A-7 (123 ml, 0.35 mmol), and triethylamine (5 mL) were added into a Schlenk flask, followed by addition of anhydrous THF (30 mL) as a solvent to obtain a mixture. The mixture was degassed using a freeze/thaw cycle (three times), and was then added with Pd (PPh$_3$)$_4$ (23 mg, 5 mol %) and CuI (4 mg, 5 mol %) within a water-free and oxygen-free glove box to obtain a reaction mixture, which was subjected to a reaction in an oil bath at 45° C. for 46 hours to obtain a reaction product. The reaction product was concentrated under reduced pressure to remove THF and triethylamine, and was then dissolved in a proper volume amount of methylene chloride. The reaction product was then extracted by adding an aqueous solution of NH$_4$Cl in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 5:1 v/v mixture of n-hexane and THF as an eluent to obtain a preliminarily purified product. The preliminarily purified product was dissolved in methylene chloride, followed by recrystallization by adding a proper volume amount of methanol to obtain Compound C-9 (269 mg, yield: 88.0%). Spectrum analysis for Compound C-9: $^1$H NMR (CDCl$_3$, 300 MHz) δ (ppm): 8.98 (d, J=8.9 Hz, 2H); 8.31-8.05 (m, 7H); 7.87 (d, J=7.7 Hz, 1H); 7.65 (t, J=8.0 Hz, 2H); 7.45 (t, J=7.8 Hz, 2H); 6.97 (s, 8H); 3.99 (s, 3H), 2.48 (t, J=7.8 Hz, 4H); 1.54 (s, 4H); 1.25 (s, 20H); 0.87 (s, 6H).

Preparation of Compound C:

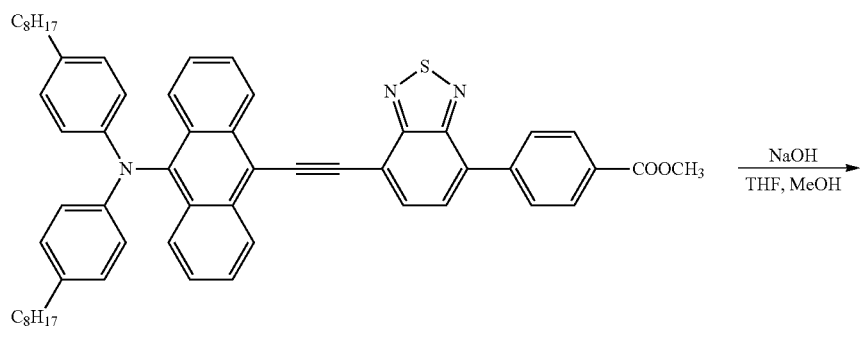

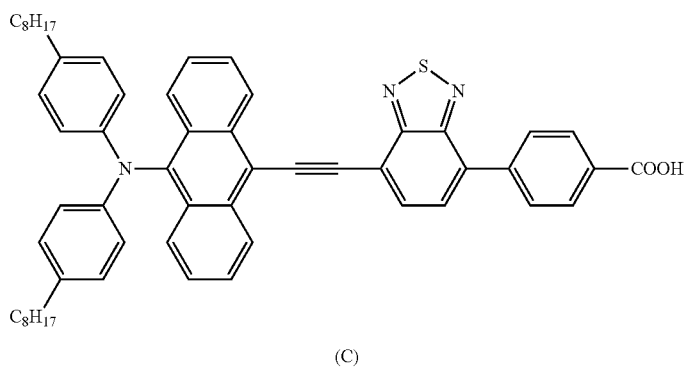

Compound C-9 (269 mg), THF (100 ml), methanol (100 ml), and an aqueous solution of NaOH (30 ml, 10 wt %) were added into a round bottom bottle to obtain a reaction mixture. The reaction mixture was heated under reflux to conduct a reaction for 1 hour to obtain a reaction product. The reaction product was concentrated under reduced pressure to remove THF and methanol, and was dissolved in a proper volume amount of methylene chloride, followed by extraction using an aqueous solution of $NH_4Cl$ in a volume amount equal to that of methylene chloride to obtain an organic phase. The organic phase was dried using anhydrous sodium sulfate, followed by evacuation to obtain a coarse product. The coarse product was purified by column chromatography on a silica gel column using a 9:1 v/v mixture of methylene chloride and methanol as an eluent to obtain a preliminarily purified product. The preliminarily purified product was dissolved in methylene chloride, followed by recrystallization by adding a proper volume amount of methanol to obtain Compound C (143 mg, yield: 54.0%). Spectrum analysis for Compound C: $^1$H NMR ($D_6$-DMSO, 300 MHz) δ (ppm): 8.99 (d, J=8.7 Hz, 2H); 8.42 (d, J=7.3 Hz, 1H); 8.19-8.10 (m, 7H); 7.80 (t, J=6.8 Hz, 2H); 7.60 (t, J=7.7 Hz, 2H); 7.02 (d, J=8.3 Hz, 2H); 6.87 (d, J=8.2, 4H); 1.79-1.23 (m, 28H); 0.84 (t, J=6.3 Hz, 6H). Elemental analysis: theoretical value for $C_{57}H_{57}N_3O_2S.0.5H_2O$: C, 79.87%: H, 4.90%; N, 6.82%; found: C, 79.60%; H, 6.78%; N, 4.83%. MALDI-TOF: theoretical value 1978.168 [M$^+$]; found 1979.199 [M$^+$].

Property Evaluation:

1. Maximum Absorption Wavelength and Molar Extinction Coefficient:

The maximum absorption wavelength ($\lambda_{max}$, nm) and molar extinction coefficient (ε, $10^{-3}M^{-1}cm^{-1}$) of each of the anthracene-based organic dyes prepared in Examples 1-3 were determined using an Agilent 8453 UV-Vis spectrophotometer. Each of samples obtained from Compound A (Example 1), Compound B (Example 2), and Compound C (Example 3) was dissolved in THF, and was determined at 298 K in a concentration range from $10^{-5}$ M to $10^{-6}$ M and in a wavelength range from 300 nm to 1100 nm.

2. Maximum Emission Wavelength:

The maximum emission wavelength ($\lambda_{max}$, nm) of each of the anthracene-based organic dyes prepared in Examples 1-3 was determined using an Agilent Eclipse fluorescence spectrophotometer. A sample obtained from Compound A (Example 1) was dissolved in THF, and was determined at 298 K at an excitation wavelength of 528 nm. A sample obtained from Compound B (Example 2) was dissolved in THF, and was determined at 298 K at an excitation wavelength of 543 nm. A sample obtained from Compound C (Example 3) was dissolved in THF, and was determined at 298 K at an excitation wavelength of 518 nm. These determinations were performed at a concentration of $2\times10^{-6}$ M in a wavelength range from 390 nm to 900 nm at a scan speed of 600 nm/min.

3. Performance of Dye-Sensitized Solar Cell (Open-Circuit Voltage, Short-Circuit Current, Fill Factor, and Photoelectric Conversion Efficiency):

Manufacture of a Dye-Sensitized Solar Cell:

A dye-sensitized solar cell is generally manufactured by assembling an electrolyte, a working electrode, and a counter electrode. The electrolyte is prepared by dissolving a 1 M solution of 1-methyl 3-propyl imidazolium iodide (PMII), a 0.05 M solution of $I_2$, a 0.125 M solution of lithium iodide (LiI), and a 0.75 M solution of tert-butyl pyridine (TBP) in a mixture composed, of acetonitrile and valeronitrile in a volume ratio of 85:15. The counter electrode is made from platinum. The working electrode is composed of four transparent active layers of $TiO_2$ (manufactured by Eternal Chemical, particle size: 15 nm to 30 nm), two scattering layers of $TiO_2$ (manufactured by Eternal Chemical, particle size: 300 nm), and the anthracene-based organic dye of the disclosure used as a photosensitizer. The working electrode was made by immersing a laminate (14.5 μm) formed from the four transparent active layers and the two scattering layers in a 0.2 mM solution of the anthracene-based organic dye of the disclosure in a mixture of toluene and ethanol in a volume ratio of 1:1 for 5 hours.

The open-circuit voltage, the short-circuit current, the fill factor, and the photoelectric conversion efficiency of the dye-sensitized solar cell in a sunlight environment and in an indoor artificial light environment were determined using a solar simulator (AM 1.5G, PET SS50 AAA-EM) for the sunlight environment and a T5 lamp tube (1000 lux) for the indoor artificial light environment, and a source meter (Keithley 2400). The dye-sensitized solar cell having a size of 0.4 cm×0.4 cm was placed at a measurement position where the dye-sensitized solar cell could be irradiated by a light source (i.e., the solar simulator or the T-5 lamp tube), and was scanned at a scan range from −0.1 V to 0.8 V with a scan pitch of 0.02 V. The open-circuit voltage, the short-circuit current, the fill factor, and the photoelectric conversion efficiency of the dye-sensitized solar cell were determined using photocurrent versus voltage (I-V) curve measurement software (Forter, FIVMAS).

4. Incident Photon-to-Electron Conversion Efficiency (IPCE):

Determination of incident photon-to-current conversion efficiency (IPCE) was performed by a 7-SCSpec system (Sofn Instruments Co., Ltd.) with a xenon lamp (7ILT250A, Sofn Instruments Co., Ltd.), a tungsten-halogen lamp (7ILT250A, Sofn Instruments Co., Ltd.), and a source meter (Keithley 2000). After spectrum calibration, the dye-sensitized solar cell was placed at a measurement position where the dye-sensitized solar cell could be irradiated by the lamps, was scanned at a scan range from 300 nm to 900 nm with a scan pitch of 10 nm to obtain a spectrum of IPCE, which was integrated to obtain a theoretical short-circuit current density.

TABLE 1

|  | UV absorption spectrum wavelength/Log ε (nm/$10^{-3}$ $M^{-1}$ $cm^{-1}$) | Emission spectrum $\lambda_{max}$ (nm) |
|---|---|---|
| Ex. 1 (Compound A) | 528/4.66 | 674 |
| Ex. 2 (Compound B) | 543/4.46 | 720 |
| Ex. 3 (Compound C) | 436/4.31 518/4.37 | 648 |

TABLE 2

| | IPCE | Photoelectric conversion performance in a sunlight environment | | | |
|---|---|---|---|---|---|
| Dye-sensitized solar cell | Theoretical short-circuit current density (mA $cm^{-2}$) | Short-circuit current density ($J_{sc}$) (mA $cm^{-2}$) | Open-circuit voltage ($V_{oc}$) (mV) | Fill factor (FF) | photoelectric conversion efficiency (η) (%) |
| Ex. 1 (Compound A) | 12.70 | 13.09 | 680 | 0.71 | 6.36 |
| Ex. 2 (Compound B) | 12.44 | 13.28 | 610 | 0.70 | 5.68 |

TABLE 2-continued

| | IPCE | Photoelectric conversion performance in a sunlight environment | | | |
|---|---|---|---|---|---|
| Dye-sensitized solar cell | Theoretical short-circuit current density (mA cm$^{-2}$) | Short-circuit current density ($J_{sc}$) (mA cm$^{-2}$) | Open-circuit voltage ($V_{oc}$) (mV) | Fill factor (FF) | photo-electric conversion efficiency ($\eta$) (%) |
| Ex. 3 (Compound C) | 6.05 | 6.27 | 610 | 0.78 | 2.96 |

TABLE 3

| | Photoelectric conversion performance in an indoor artificial light environment (a T5 lamp tube, 1000 lux) | | | |
|---|---|---|---|---|
| Dye-sensitized solar cell | Short-circuit current density ($J_{sc}$) (mA cm$^{-2}$) | Open-circuit voltage ($V_{oc}$) (mV) | Fill factor (FF) | photoelectric conversion efficiency ($\eta$) (%) |
| Ex. 1 (Compound A) | 0.086 | 577 | 0.76 | 11.32 |
| Ex. 2 (Compound B) | 0.079 | 443 | 0.59 | 6.26 |

As shown in Tables 2 and 3, the dye-sensitized solar cells including the anthracene-based organic dyes prepared in Examples 1-3 have satisfactory photoelectric conversion performance in both the sunlight environment and the indoor artificial light environment. Specifically, the dye-sensitized solar cell including the anthracene-based organic dye prepared in Example 1 has a photoelectric conversion efficiency of 11.32% in the indoor artificial light environment. It is demonstrated that the dye-sensitized solar cells including the anthracene-based organic dyes prepared in Examples 1-3 may effectively absorb light in the sunlight environment and in the indoor artificial light environment and convert the absorbed light into photoelectric currents.

As shown in FIG. 1, the dye-sensitized solar cell including the anthracene-based organic dye prepared in Example 1 absorbed light having a wavelength range which covers the entire wavelength range of visible light and which even expands to a near infrared wavelength range. The working electrode of the dye-sensitized solar cell including the anthracene-based organic dye prepared in Example 1 has a deep purple color in the sunlight environment and a deep black color in the indoor artificial light environment. This indicates that the dye-sensitized solar cell including the anthracene-based organic dye prepared in Example 1 may absorb light having a wavelength range which covers the entire wavelength range of visible light and which even expands to a near infrared wavelength range, and may effectively absorb visible light in sunlight and particularly in an artificial light environment (i.e., the photoelectric conversion efficiency in the indoor artificial light environment is larger than that in the sunlight environment). Likewise, the working electrode of the dye-sensitized solar cell including the anthracene-based organic dye prepared in Example 2 has a deep black color in both the sunlight environment and the indoor artificial light environment. This indicates that the dye-sensitized solar cell including the anthracene-based organic dye prepared in Example 2 also may absorb light having a wavelength range which covers the entire wavelength range of visible light and which even expands to a near infrared wavelength range and may effectively absorb visible light in sunlight and particularly in an artificial light environment (i.e., the photoelectric conversion efficiency in the indoor artifical light environment is larger than that in the sunlight environment).

In view of the aforesaid, the anthracene-based organic dye of the disclosure may be used as a photosensitizer in dye-sensitized solar cells to effectively absorb light having a wavelength range which covers the entire wavelength range of visible light and which even expands to a near infrared wavelength range and to convert the absorbed light into photoelectric current.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An anthracene-based organic dye represented by Formula (1):

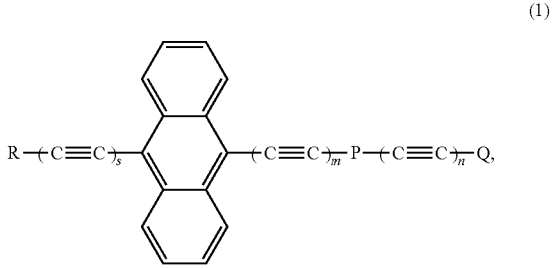

(1)

wherein
s, m, and n represent independently 0 or 1;
Q is an anchoring group selected from the group consisting of

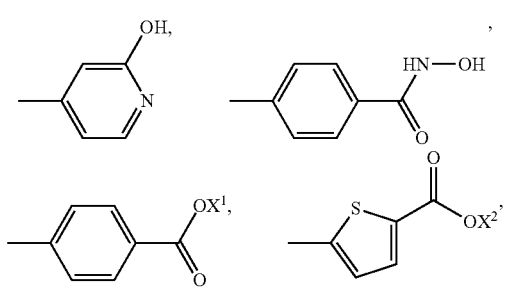

-continued

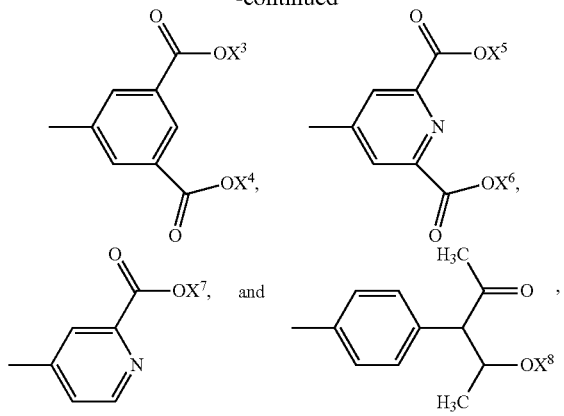

wherein $X^1$, $X^2$, $X^3$, $X^4$, $X^5$, $X^6$, $X^7$, and $X^8$ are independently selected from the group consisting of hydrogen, lithium, sodium and

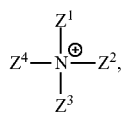

wherein $Z^1$, $Z^2$, $Z^3$, and $Z^4$ represent independently a $C_1$-$C_6$ alkyl group;

P is an electron acceptor group selected from the group consisting of

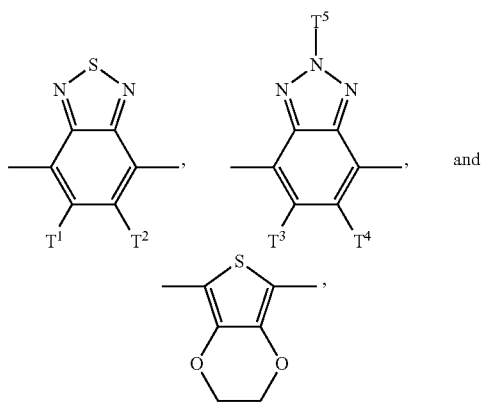

wherein $T^1$, $T^2$, $T^3$, and $T^4$ are independently selected from the group consisting of hydrogen, fluoro, a $C_4$-$C_{12}$ alkyl group, and a $C_4$-$C_2$ alkoxy group, and $T^5$ is selected from the group consisting of hydrogen and a $C_4$-$C_{17}$ alkyl group; and R is an electron donor group with the proviso that
  R is selected from the group consisting of

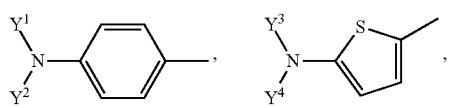

-continued

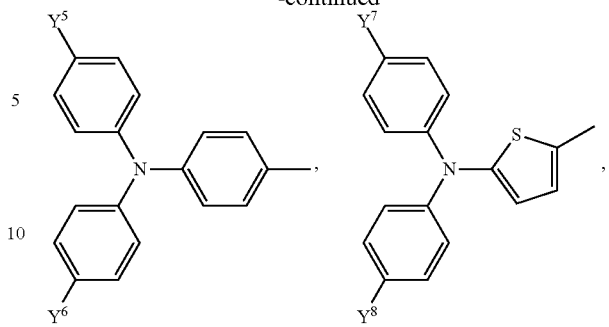

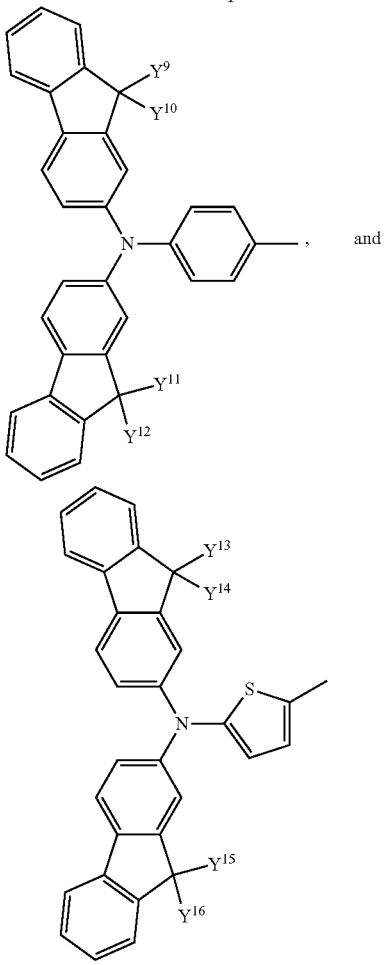

when s represents 1, and
R is selected from the group consisting of

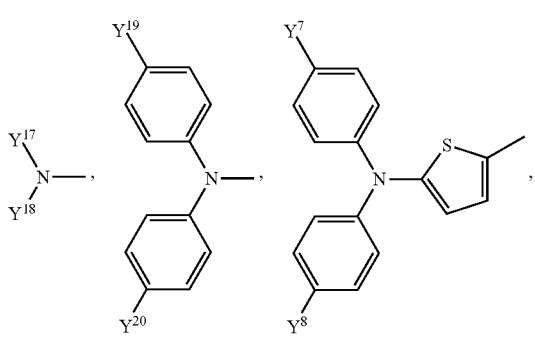

-continued

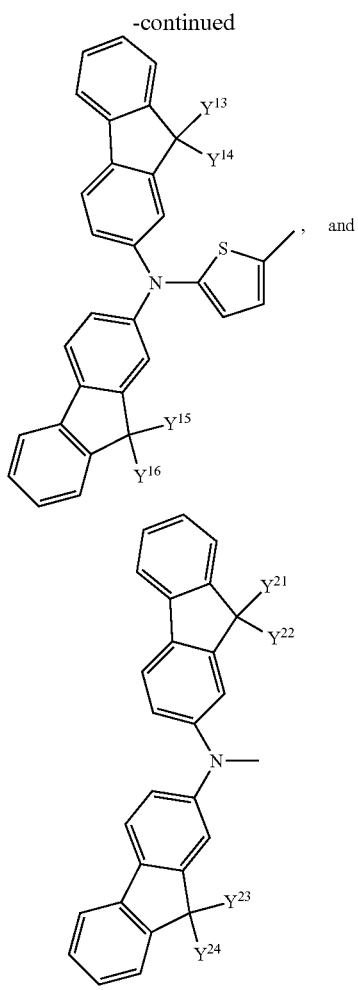

when s represents 0,
wherein
$Y^1, Y^2, Y^3, Y^4, Y^9, Y^{10}, Y^{11}, Y^{12}, Y^{13}, Y^{14}, Y^{15}, Y^{16}, Y^{17}, Y^{18}, Y^{21}, Y^{22}, Y^{23}$, and $Y^{24}$ are independently selected from the group consisting of hydrogen and a $C_4$-$C_{12}$ alkyl group, and
$Y^5, Y^6, Y^7, Y^8, Y^{19}$, and $Y^{20}$ are independently selected from the group consisting of hydrogen, fluoro, a $C_4$-$C_{12}$ alkyl group, and a $C_4$-$C_{12}$ alkoxy group.

2. The anthracene-based organic dye according to claim 1, wherein s and m represent independently 1, and n represents 0 or 1.

3. The anthracene-based organic dye according to claim 2, wherein P represents

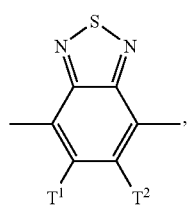

wherein $T^1$ and $T^2$ are independently selected from the group consisting of hydrogen, fluoro, a $C_4$-$C_{12}$ alkyl group, and a $C_4$-$C_{12}$ alkoxy group.

4. The anthracene-based organic dye according to claim 3, wherein R represents

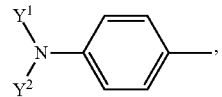

wherein $Y^1$ and $Y^2$ are independently selected from the group consisting of hydrogen and a $C_4$-$C_{12}$ alkyl group.

5. The anthracene-based organic dye according to claim 4, wherein Q represents

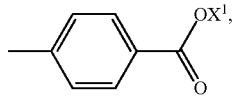

wherein $X^1$ is selected from the group consisting of hydrogen, lithium, sodium, and

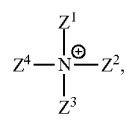

wherein $Z^1, Z^2, Z^3$, and $Z^4$ represent independently a $C_1$-$C_6$ alkyl group.

6. The anthracene-based organic dye according to claim 1, wherein s and n represent independently 0, and m represents 1.

7. The anthracene-based organic dye according to claim 6, wherein R represents

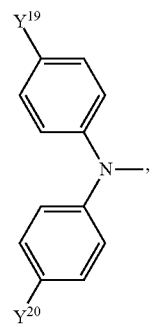

wherein $Y^{19}$ and $Y^{20}$ are independently selected from the group consisting of hydrogen, a $C_4$-$C_{12}$ alkyl group, and a $C_4$-$C_{12}$ alkoxy group.

8. The anthracene-based organic dye according to claim 7, wherein P represents

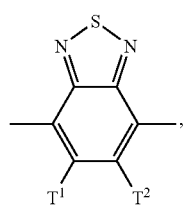

wherein $T^1$ and $T^2$ are independently selected from the group consisting of hydrogen, fluoro, a $C_4$-$C_{12}$ alkyl group, and a $C_4$-$C_{12}$ alkoxy group.

9. The anthracene-based organic dye according to claim 8, wherein Q represents
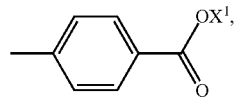
wherein $X^1$ is selected from the group consisting of hydrogen, lithium, sodium, and
wherein $Z^1$, $Z^2$, $Z^3$, and $Z^4$ represent independently a $C_1$-$C_6$ alkyl group.
* * * * *